United States Patent [19]

Seiden

[11] Patent Number: 4,664,921
[45] Date of Patent: May 12, 1987

[54] DUAL-TEXTURED COOKIE PRODUCTS CONTAINING NARROW MELTING RANGE SHORTENINGS

[75] Inventor: Paul Seiden, Cincinnati, Ohio

[73] Assignee: The Procter & Gamble Co., Cincinnati, Ohio

[21] Appl. No.: 722,533

[22] Filed: Apr. 12, 1985

[51] Int. Cl.$^4$ .............................................. A12D 13/08
[52] U.S. Cl. ...................................... 426/94; 426/558; 426/560; 426/613
[58] Field of Search ................. 426/94, 103, 549, 560, 426/601, 653, 654, 613, 558

[56] References Cited

U.S. PATENT DOCUMENTS

| | | | |
|---|---|---|---|
| 3,012,891 | 12/1961 | Best et al. | 99/118 |
| 3,244,536 | 4/1966 | Kidger | 99/139 |
| 3,307,953 | 3/1967 | Siebers | 99/23 |
| 3,353,964 | 11/1967 | Seiden | 99/118 |
| 3,431,116 | 3/1969 | Feuge et al. | 99/118 |
| 3,459,777 | 8/1969 | Seiden et al. | 260/409 |
| 3,512,994 | 5/1970 | Brown et al. | 99/118 |
| 3,615,682 | 10/1971 | La Baw et al. | 99/92 |
| 3,686,240 | 8/1972 | Kawada et al. | 260/409 |
| 3,889,011 | 6/1975 | Read | 426/604 |
| 3,949,105 | 4/1976 | Wieske et al. | 426/607 |
| 4,160,850 | 7/1979 | Hallstrom et al. | 426/601 |
| 4,335,156 | 6/1982 | Kogan et al. | 426/603 |
| 4,344,969 | 8/1982 | Youngquist et al. | 426/18 |
| 4,360,534 | 11/1982 | Brabbs et al. | 426/94 |
| 4,390,561 | 6/1983 | Blair et al. | 426/607 |
| 4,396,639 | 8/1983 | Boder et al. | 426/603 |
| 4,425,371 | 1/1984 | Stratmann et al. | 426/603 |
| 4,438,149 | 3/1984 | Verhagen et al. | 426/603 |
| 4,455,333 | 6/1984 | Hong et al. | 426/94 |
| 4,503,080 | 3/1985 | Brabbs et al. | 426/94 |

OTHER PUBLICATIONS

Potter, N. N., *Food Science*, The Avi Publ. Co., Inc., Westport, Conn., pp. 443 and 454–457 (1973).
Johnson, A. H. et al., *Encyclopedia of Food Technology*, The Avi Publ. Co., Inc., Westport, Conn., pp. 575 and 798–798 (1974).
Pyler, E. J., *Baking Science and Technology*, vol. 1, Siebel Publ. Co., Chicago, Ill., pp. 74–76, 451–452, 462–463 (1973).

*Primary Examiner*—Robert Yoncoskie
*Attorney, Agent, or Firm*—Gary M. Sutter; Rose Ann Dabek; Richard C. Witte

[57] ABSTRACT

This invention comprises crumb-continuous cookie products having distributed therein discrete regions of storage-stable crisp texture and discrete regions of storage-stable chewy texture in which the crisp regions contain a shortening having an SCI at 21° C. of from about 14.0 to about 20.0 and an SCI at 33° C. of from about 0.0 to about 8.0 and the chewy regions contain a shortening having an SCI at 21° C. of from about 12.0 to about 18.0 and an SCI at 33° C. of below about 2.0. The shortening system having these melting characteristics provides a more tender crumb texture, more desirable mouthmelt and dissipation and better flavor display in the cookie.

25 Claims, No Drawings

4,664,921

DUAL-TEXTURED COOKIE PRODUCTS CONTAINING NARROW MELTING RANGE SHORTENINGS

TECHNICAL FIELD

The present invention relates to baked food products, in particular, cookies. Fresh, home-baked cookies are the standard of excellence in the cooking world. An important feature of most fresh, home-baked cookies is their texture, specifically, a crisp, friable outside surface and a ductile interior. This invention provides cookies which closely approximate the taste and texture of a home-baked cookie.

In most classes of baked goods, including cookies, fat is a highly necessary ingredient, not only because of its contribution to the flavor of the product, but also because it plays an essential role in the development of the physical structure. Such important considerations as the volume, the texture, and the tenderness of the finished goods are all closely related to the amount of fat used in the formula, the methods employed in incorporating it, and the inherent characteristics of the fat itself. There are considerable differences in the behavior of different kinds of fat in the manufacture of specific classes of baked goods.

BACKGROUND OF THE INVENTION

Traditionally, fresh homebaked cookes have exhibited a slightly crisp outer surface texture and a chewy, more ductile interior, while commercially prepared cookies have exhibited only a single texture, in most cases relatively hard and crisp. A recent development in the cookie industry is a storage-stable, crumb continuous dual texture cookie which closely approximates homemade yet does not deteriorate when stored in a warehouse or on a store shelf for reasonable periods of time.

Cookies of the type disclosed in U.S. Pat. No. 4,455,333 of Hong and Brabbs, issued June 19, 1984, are formed from a plurality of doughs, at least one of which contains either crystallization-resistant sugar or readily crystallizable sugar in combination with a sugar crystallization inhibitor, and at least one of which contains a conventional readily crystallizable sugar, in such a manner that the doughs remain segregated in discrete regions within the unbaked cookie. A matrix is formed which can be baked to a cookie having portions which provide a storage-stable crisp texture and portions which provide a storage-stable chewy texture. It is recognized that consumer perception of cookie freshness has only a limited relationship to the spatial orientation and organization of the two types of doughs/textures within the cookie.

It has now been discovered that the crumb texture, mouthmelt and dissipation, flavor and oxidative stability, dough stability, and flavor display of dual-textured crumb-continuous cookie products is greatly improved by use of a shortening system having a unique solids content index profile (hereinafter referred to as SCI). The shortenings have a very low level of body temperature solids at a temperature of 33° C. and a relatively large SCI spread between about 21° C. and about 33° C.

U.S. Pat. No. 4,455,333 of Hong et al, issued June 19, 1984, describes laminated cookies which combine different doughs to produce a product whose long-term texture remains crisp and chewy, similar to fresh-baked cookies. The examples in Hong call for a specific weight percent of hydrogenated vegetable shortening and mixtures of hydrogenated vegetable shortening and an oil. No mention is made of the SCI of the shortening or the difference in SCI profiles between the doughs.

U.S. Pat. No. 4,503,080 of Brabbs and Hong, issued Mar. 5, 1985, describes similar dual-textured crumb continuous cookies wherein the discrete regions of crisp texture contain readily crystallizable sugar and the discrete regions of chewy texture contain readily crystallizable sugar plus a polyol crystallization inhibitor.

U.S. Pat. No. 4,344,969 of Youngquist et al, issued Aug. 17, 1982, describes a process for preparing cookies having storage-stable, chewy and crisp textures from a single dough wherein sugar crystallization is controlled by enzyme activity. Manipulation of water activity is one means used for activating and inactivating enzymes in selected portions of the cookie. Thus, sugars and/or starches in the areas where the enzyme is active are converted into mixtures which are non-crystallizing or crystallization-resistant, while the crystallization behavior of sucrose is preserved in those areas where the enzyme is inactive. The resulting dough and subsequent crumb areas of the baked cookie have storage-stable, chewy and crisp textures, respectively.

U.S. Pat. No. 3,459,777 of Seiden, issued Aug. 5, 1969, discloses a method for the catalytic hydrogenation of oils. U.S. Pat. No. 3,353,964 to Seiden, issued Nov. 21, 1967, relates to the preparation of corandomized margarine oils. Both patents disclose oils with SCI's in the range of those of the present application. However, neither discloses their use in a dual-textured crumb-continuous cookie, or their use in baked goods to improve texture, mouthmelt, flavor display, and shelf stability.

It is an object of this invention to provide a crumb-continuous dual-textured cookie having improved texture, mouthmelt and dissipation, flavor display, dough stability, and flavor and oxidative stability. It is a further object of this invention to provide a cookie dough preform, containing at least two doughs, which when baked provides a dual-textured cookie having improved texture, mouthmelt and dissipation, flavor display, dough stability, and flavor and oxidative stability.

SUMMARY OF THE INVENTION

Crumb-continuous cookie products having distributed therein discrete regions of storage-stable crisp texture and discrete regions of storage-stable chewy texture and sweetened food products in the form of cookie dough preforms are claimed. These products contain a unique shortening system and are comprised of at least two doughs in which the first dough contains shortening having an SCI at 21° C. of from about 14.0 to about 20.0 and an SCI at 33° C. of from about 0.0 to about 8.0 and the second dough contains a shortening having an SCI at 21° C. of from about 12.0 to about 18.0 and an SCI at 33°C. of below about 2.0. The shortening system having these melting characteristics provides a more tender crumb texture, more desirable mouthmelt and dissipation, better flavor display in the cookie.

DISCLOSURE OF THE INVENTION

The present invention provides an improved sweetened food product in the form of a cookie dough preform, or the like, which, when baked, provides a storage-stable plurality of textures, and the cookies made therefrom. The unbaked product comprises a matrix made from cookie ingredients, and characterized in having distributed therein discrete regions of dough containing readily crystallizable sugar and a shortening having an SCI of from about 14 to about 20 at 21° C. and from about 0 to about 8 at 33° C., and discrete regions of dough containing either crystallization-resistant sugar or readily crystallizable sugar and a sugar crystallization inhibitor, and a shortening having an SCI of from about 12 to about 18 at 21° C. and from about 0 to about 2 at 33° C., whereby the product, when baked, provides a cookie having a storage-stable plurality of textures.

The dough products of this invention can be packaged and stored, preferably refrigerated or frozen, for baking by the consumer. Such dough products, when baked, produce cookies which, after equilibration, retain a plurality of textures over long periods of time, when stored in sealed containers. The dough products of this invention also can be baked into cookies by the manufacturer. The cookies, when packaged in relatively air- and moisture-tight containers, provide the plurality of textures they had when freshly baked, for periods of up to several months, and longer.

The improved cookie products of this invention comprise a crumb-continuous matrix of the type described in Hong and Brabbs made from cookie ingredients, and have distributed therein discrete regions of crumb containing readily crystallizable sugar and discrete regions of crumb containing either crystallization-resistant sugar or uncrystallized readily crystallizable sugar and a sugar crystallization inhibitor, whereby the product provides a storage-stable plurality of textures, the regions containing crystallized sugar providing a crisp texture and the regions containing uncrystallized sugar providing a chewy texture.

The cookies of this invention are of the "crumb-continuous" type which typically have a relatively uniform distribution of the crumb ingredients throughout the cookie, e.g. oatmeal cookies, chocolate chip or Toll House TM cookies, peanut butter cookies, sugar cookies, and other drop-type cookies. This is in distinction to the filled, coated, and sandwich-type cookies known to the art.

By "storage-stable" is meant that the cookies produced by the practice of this invention, after reaching substantial textural equilibrium, retain a plurality of textures for extended periods. Depending upon their formulation, cookies prepared by the practice of this invention will, after equilibration, retain their original texture for periods ranging from weeks, at a minimum, to many months, or even indefinitely, with proper packaging and maintenance of package integrity.

By "substantial textural equilibrium" is meant the point at which those physico-chemical and structural features responsible for texture, and those physico-chemical and structural processes responsible for changes in texture have reached an approximately steady state relative to the expected usable life and storage conditions of the product.

By "cookie ingredients" is meant those ingredients commonly used in cookies, namely, sugar, flour, water, and shortening, as well as those additional flavoring and texturing ingredients desired in the particular system being formulated. Such latter ingredients would include nutmeats, cereals, raisins, and chocolate chips, as well as egg, vanilla, cinnamon, cocoa, and the numerous other similar materials commonly found in cookies, as desired.

By "flour" is meant the finely comminuted meal of any cereal grain or edible seed. Typical non-limiting examples are wheat flour, barley flour, rye flour, corn starch and corn flour, but also encompassed by this term as used herein are the so-called synthetic flours, which incorporate such materials as starch and soy protein isolate, with or without head and/or steam treatment.

The term "water activity" ($a_w$) is used herein in its usual context to mean the ratio of the fugacity of water in the system being studied (f) to the fugacity of pure water ($f_o$) at the same temperature. The water activity of the products and compositions herein can be measured using well-known physical chemical techniques and commercially available instruments.

By "readily crystallizable sugar" is meant a mono- or disaccharide, or mixture of mono- and/or disaccharides, that readily and spontaneously crystallizes at the water content and water activity conditions encountered in semi-moist cookies of the home-baked type. Sucrose is virtually unique among the readily availble food sugars in this regard.

By "sugar crystallization inhibitor" is meant a compound or composition which inhibits sucrose or other readily-crystallizable sugar crystallization in the baked cookie, so that the sugar crystallizes, at the water content and water activity encountered in semi-moist cookies of the home-baked type, substantially more slowly than the same sugar would under the same conditions in the absence of the inhibitor.

By "crystallization-resistant sugar" is meant a mono- or disaccharide, or mixture of mono- and/or disaccharides, which crystallizes, at the water content and water activity encountered in the semimoist cookies of the home-baked type, substantially more slowly than sucrose under the same conditions, typically remaining uncrystallized for periods of at least 1-6 months. Particularly good crystallization-resistant sugars are fructose, dextrose, and mixtures of sugar of which fructose and dextrose together comprise at least about 15% by weight, and solutions thereof.

"Monosaccharides" and "disaccharides" as used herein are compounds well known to the art. Monosaccharides have the empirical formula $(CH_2O)_n$, where n is equal to or greater than 3. The carbon skeleton of the common monosaccharides is unbranched and each carbon except one bears an —OH group; the remaining carbon is generally combined in an acetal or ketal linkage. Disaccharides consist of two monosaccharides joined by a glycosidic linkage.

By "baking" herein is meant radiant, conductive, or convective exposure to energy of a type which imparts thermal energy to the product being baked. It thus includes conventional, convection, dielectric and microwave oven baking.

The term "laminated" is used herein to indicate discrete regions of one or more textures in a baked product, specifically discrete regions of crisp and chewy textures. It includes but is not limited to superimposed layers of one or more materials.

The term "chewy dough" is usable to denote a dough that will have a chewy texture after baking and equilibrating.

The term "crisp dough" is used to denote a dough that will have a crisp texture after baking and equilibrating.

By "shortening" is meant an edible triglyceride fat based compound suitable for cooking or baking. Although a suitable emulsifier may be included in the products of the present invention, the term "shortening" as used herein does not include an emulsifier.

The cookie products of this invention utilize a new shortening system consisting of two separate shortenings, each having a unique solids content index (SCI) profile and a very low level of body temperature solids. After hydrogenating a suitable oil to prepare the shortenings, the SCI profile is further adjusted by blending up to 45% partially hydrogenated soybean oil or other oil low in fat solids content into the shortening. If beta prime stability is desired, this can be attained by incorporating from about 2% to about 80% of a highly beta-prime stable oil, or oil blend, such as hydrogenated cottonseed and/or palm oils or palm oil olein into the shortening formulation.

The dough having readily crystallizable sugar contains from about 10% to about 30% of a shortening having an SCI at 21° C. of from about 14.0 to about 20.0 and an SCI at 33° C. of from about 0.0 to about 8.0 and the dough containing the crystallization-resistant sugar contains from about 10% to about 30% of a shortening having an SCI at 21° C. of from about 12.0 to about 18.0 and an SCI at 33° C. of below about 2.0. Use of this shortening system in a dual-textured crumb-continuous cookie results in an optimum mouthmelt and dissipation, flavor display, dough stability, and flavor and oxidative stability.

In order to obtain an optimum mouthmelt, dissipation, and flavor display, there should be virtually no solids present at mouth temperature. While the temperature of the human body is normally near 98.6° F., the mouth temperature while eating is generally slightly lower due to the inhalation of cooler air. Thus, the SCI of the shortening in the cookie should closely approach 0 at a temperature of about 92° F. Significant solids residue in the mouth at this temperature results in an undesirable grainy or pasty sensation. Furthermore, if the fat solids content at this temperature is too high, flavor release is inhibited because the flavor is entrapped within the solids and is unable to dissipate in the mouth properly. Use of shortening having SCI values within the claimed ranges results in a cookie which has a crispy-chewy texture initially, but quickly melts in the mouth without leaving excess solids residue.

The steepness of the SCI vs. temperature profile of the shortening of the present invention results in a highly stable product, since enough solids are present at room temperature (approximately 70° F.) to entrap the oil in the crystals, thus preventing oil separation. The product also has good flavor and oxidative stability due to its low linoleic and linolenic acid content. The oxidative characteristics of unsaturated fatty acids lead to a linear relationship between the reciprocal of the keeping time of a fat and the concentration of active methylene groups, as determined by the content of linoleic and linolenic acids. Certinly a part, if not all, of off-flavor development is due to oxidative breakdown. The oxidation reaction generates volatile products, notably aldehydes. The primary point of oxidative attack is the reactive hydrogen-carbon group between double bonds. Thus, an oil's oxidation rate correlates with the number of double bonds, the degree of unsaturation.

It is preferred that the solid glycerides of the shortening be predominantly in the beta prime crystal phase when the product is consumed. By beta-prime stable is meant the shortening crystallizes into and remains for a significant period of time predominantly in the crystalline form known as beta-prime. Fats which contribute to beta-prime stability and are preferred for use herein are hydrogenated oils high in palmitic acid in the 1, and in the 1 and 3 position of the glycerol, such as cottonseed oil, palm oil, and palm oil olein. In general, a shortening that is unstable in the beta prime crystalline phase and converts predominantly into the beta phase tends to be waxy or grainy. These characteristics are desirable in some instances, and shortenings can easily be formulated to produce these effects. However, such shortenings are not preferred in the present invention due to a lack of creaming ability because their crystal structure tends to break down under severe working.

The use of beta prime stable shortening for cookies, while not essential to the production of an acceptable cookie, is greatly preferred. If a shortening which is unstable in the beta prime form, for example, partially hydrogenated Canola oil, is used, the initially small beta prime crystals will gradually transform into large and higher melting agglomerates of beta crystals. The high melting large and grainy beta crystals detrimentally affect the taste and mouthmelt of the cookie. To produce cookies with good mouthmelt and dissipation and flavor display that will retain these characteristics under adverse storage conditions, it is greatly preferred that the solid glycerides present remain predominantly in the beta-prime form.

The preferred method of attaining beta-prime stability in the present application is to blend from about 50% to about 90% of a vegetable oil such as soybean, sunflowerseed, or safflower oil with from about 10% to about 50% of a highly beta-prime stable base fat, such as partially hydrogenated cottonseed, palm oil, and/or palm oil olein.

DESCRIPTION OF A PREFERRED EMBODIMENT

The preferred cookie and cookie dough products of the present invention are made by the process of preparing a first cookie dough from typical cookie ingredients containing a crystallization-resistant sugar or a sucrose or solution thereof as disclosed herein plus, optionally, an effective amount of a sugar crystallization inhibitor for the sucrose, preparing a second cookie dough, containing a sucrose or solution thereof also as disclosed herein, and substantially enveloping said first dough with a layer of said second dough, thereby forming a ready-to-bake, laminated dough structure which is then baked to yield an improved dual textured cookie.

The shortening component of the doughs is obtained by the process of hydrogenating a vegetable oil, a marine oil, an animal fat, or blends thereof, to obtain SCI values as close as possible to the desired values, as previously defined. Preferably, the oil is a vegetable oil having fatty acid chains containing from about 14 to about 20 carbon atoms. Oils useful in the present invention include soybean, sunflowerseed, safflower, corn, Canola, palm, palm oil olein, coconut, palm kernal, peanut, olive, and cottonseed oil. Preferred oils include soybean, sunflowerseed, cottonseed, safflower, palm, corn, and Canola oil. The most preferred oils are soybean, cottonseed, and palm oil. Preferred animal fats include tallow olein and fractionated or modified lard. Preferred marine oils include menhaden, pilcherd, sardine and herring oil. Oils preferred for achieving beta-prime stability include cottonseed oil, palm oil, and palm oil olein. Corn, palm, and cottonseed oil will form an acceptable shortening when hydrogenated alone. However, most often, a blend of two or more oils is used to obtain the desired solids content, beta-prime stability, and iodine values (IV). The oils may be blended either prior to or following hydrogenation. A preferred blend is soybean and cottonseed oil. From about 2% to about 80% of a highly beta-prime stable fat or oil such as hydrogenated cottonseed and/or palm oils may be incorporated into the shortening formula to obtain beta prime stability. The SCI slope of the oil can be modified by blending up to 45% of a soft vegetable oil such as soybean oil, partially hydrogenated to an IV of from about 100 to about 112, or cottonseed, fractionated cottonseed, peanut, olive, corn, sesame, sunflower, safflower, or a partially hydrogenated Canola oil. This results in a reduced linolenic acid concentration.

The oils may be hydrogenated by any process which will result in a product having the desired SCI characteristics. A preferred process is disclosed in U.S. Pat. No. 3,459,777, Seiden, issued Aug. 5, 1969. A more preferred process is disclosed in U.S. application Ser. No. 722,928, Seiden et al. The Seiden application discloses a process for catalytically hydrogenating liquid oils in which a liquid oil having an iodine value of from about 95 to about 145 is hydrogenated in the presence of a partially deactivated nickel catalyst having a concentration of nickel of from about 0.01% to about 0.2% by weight of the oil. The hydrogenation process is carried out at a temperature which is gradually increased from a starting temperature of from about 160° C. (320° F.) to about 200° C. (392° F.) to a final temperature of from about 210° C. (410° F.) to about 250° C. (482° F.) and a pressure of from about 0 psig to about 100 psig. The process is terminated when the iodine value of the oil reaches a value of from about 65 to about 91.

The dough containing readily crystallizable sugar is prepared using from about 10% to about 30%, and preferably from about 16% to about 22%, of a shortening component having an SCI at 70° F. of from about 14.0 to about 20.0, and preferably from about 15.0 to about 19.0 and an SCI at 92° F. of from about 0.0 to about 8.0, and preferably from about 0.0 to about 3.0. The dough containing crystallization-resistant sugar is prepared using from about 10% to about 30%, and preferbly from about 16% to about 22%, of a shortening component having an SCI at 70° F. of from about 12.0 to about 18.0, and preferably from about 13.0 to about 17.0 and an SCI at 92° F. of not greater than about 2, and preferably 0.

Preferably, the cookies and doughs of the present invention contain a suitable emulsifier system. A preferred emulsifier system, further described in copending U.S. application Ser. No. 722,927 of Seiden et. al, comprises from about 40% to about 100% (by weight based on the monoglyceride content) of fatty acid monodiglycerides having from about 35% to about 99% fatty acid monoglycerides, and from about 1% to about 50% fatty acid diglycerides, wherein at least about 65% of said fatty acids are selected from the group consisting of $C_{14}$-$C_{20}$ saturated fatty acids thereof with $C_{16}$-$C_{20}$ trans-unsaturated fatty acids and mixtures.

The most preferred emulsifier system is a multi-component emulsifier system comprising:

(a) from about 40% to about 100% (by weight based on the monoglyceride content) fatty acid monodiglycerides having from about 35% to about 99% fatty acid monoglycerides, and from about 1% to about 50% fatty acid diglycerides, wherein at least about 65% of said fatty acids are selected from the group consisting of $C_{14}$-$C_{18}$ saturated fatty acids and $C_{16}$-$C_{20}$ trans-unsaturated fatty acids and mixtures thereof;

(b) from about 0% to about 60% (by weight) fatty acid esters of sucrose or polyglycerol having from 4 to 14 hydroxyl groups, wherein from about 10% to about 66% of the hydroxyl groups are esterified, and wherein at least about 65% of said fatty acids are selected from the group consisting of $C_{14}$-$C_{20}$ saturated fatty acids and $C_{16}$-$C_{20}$ trans-unsaturated fatty acids and mixtures thereof;

(c) from about 0% to about 60% (by weight) of fatty acid monoglyceride esters of polycarboxylic acids and their derivatives, wherein at least about 65% of said fatty acids are selected from the group consisting of $C_{14}$-$C_{20}$ saturated fatty acids. Sugar, flour, water and shortening, when combined in almost any reasonable proportions, will produce a dough that can be baked to form a cookie—the classic "sugar cookie". Of course, the sweetness, texture and similar organoleptic properties of the cookie will depend upon the ratio of sugar/flour/water/shortening. In general, any cookie recipe which produces an organoleptically acceptable crumb-continuous cookie (as opposed to filled, iced and sandwich-type cookies), and contains shortening having SCI values within the specified ranges, can be employed in the practice of the present invention.

The baked food products of the present invention, i.e., cookies, are made by the process described hereinabove, which process further comprises the step of baking the dough structure, preferably to a final water activity, $a_w$, of from about 0.25 to about 0.8, most preferably from about 0.45 to about 0.60. While not intended to be limited by past practice, cookie baking times typically range from about five minutes to about fifteen minutes, depending on the number of cookies being baked, the size and shape of the cookie, the cookie ingredients, oven temperature, and like factors. The baking process is straightforward, no modifications being needed for the practice of this embodiment. Baking can either be performed in the batch mode, as is typically done in the home, or in continuous fashion, as is often done in commercial bakeries.

A variety of cookies can be produced by the foregoing process, depending, of course, upon the adjunct ingredients used in preparing the doughs, including sugar cookies, oatmeal cookies, peanut butter cookies, chocolate chip cookies, and double chocolate chip cookies.

While the foregoing illustrates one preferred mode of practicing this embodiment of the present invention, other, potentially less preferable executions of this embodiment of the invention can also be practiced.

The solid content referred to hereinabove is expressed at different temperatures, in terms of a "Solids Contents Index" (SCI) which is measured by what is essentially the test described in the Journal of the American Oil Chemists' Society, March 1954, Vol. XXXI, pp. 98–103. The test involves a dilatometric measurement of the amount by which a fat expands when heated from a specific temperature to complete melting. Since this expansion is due to both a volume increase when solids change to liquids without a temperature change and a volume increase due to thermal expansion without change in phase from solid to liquid, allowance is made for the thermal expansion so that the change in volume gives a measure of the amount of solid phase present at the temperature of measurement. The test has been modified so that readings are taken after 30 minutes at the temperature of measurement.

The fatty acid content was determined by gas chromatography, utilizing a Hewlett-Packard Model S712A gas chromatograph equipped with a thermal conductivity detector and a Hewlett-Packard Model 7671A automatic sampler. The chromatographic method utilized is described in *Official Methods and Recommended Practices of the American Oil Chemists Society*, 3rd Ed., 1984, Procedure Ce 1-62. It should be recognized that results obtained may deviate. This deviation can range from about 5% relative at values of from about 20 to 100% up to about 100% relative at values of less than 1%. Thus, results will not be exactly reproducible.

The following examples illustrate the broad range of industrial applicability of the present invention, without intending to be limiting thereof. It will be appreciated that other modifications of the present invention, within the skill of those in the baking arts, can be undertaken without departing from the spirit and scope of this invention.

All percentages herein are by weight, unless otherwise indicated.

EXAMPLE 1

| Ingredients | Weight percent |
| --- | --- |
| Outer Dough (First Dough) | |
| Shortening 1 | 13.97 |
| Plastic shortenng | 4.66 |
| Polyglycerol esters | 0.28 |
| Whole eggs | 1.02 |
| Baking soda | 0.51 |
| Sugar (sucrose) | 35.09 |
| Flour | 32.79 |
| Starch | 0.50 |
| Salt | 0.63 |
| Water | 8.79 |
| Molasses | 1.51 |
| Egg white solids | 0.25 |
| Inner Dough (Second Dough) | |
| Shortening 1 | 18.80 |
| Mono- and diglycerides | 0.66 |
| Polyglycerol esters | 0.14 |
| Diacetyl tartaric acid esters of monoglycerides | 0.19 |
| High fructose corn syrup | 30.82 |
| Whole eggs | 2.01 |
| Baking soda | 0.51 |
| Sugar (sucrose) | 12.49 |
| Flour | 31.73 |
| Starch | 2.24 |
| Salt | 0.41 |
| Shortening 1 | |
| Hydrogenated soybean oil | 54.0 |
| Hydrogenated cottonseed oil | 3.0 |
| Slightly hydrogenated soybean oil | 43.0 |

Shortening 1 was prepared by hydrogenating the soybean oil to an IV of 83 and the cottonseed oil to an IV of 61, then blending the two oils. The SCI was then further adjusted by adding a slightly hydrogenated soybean oil having an IV of from about 105 to about 110. The shortening produced had the following characteristics:

| SCI: | |
| --- | --- |
| 10° C. (50° F.) | 28.6 |
| 21° C. (70° F.) | 15.1 |
| 33° C. (92° F.) | 0.0 |
| % trans-unsaturated fatty acid: | 44.1 |
| fatty acid content: | |
| palmitic (C-16) | 10.9 |
| stearic (C-18) | 4.4 |
| octadecenoic (C-18:1) | 59.9 |
| octadecadienoic (C-18:2) | 22.9 |
| octadecatrienoic (C-18:3) | 1.7 |
| behenic (C-22) | 0.3 |

A commercially available plastic shortening was included in the outer dough to aid in containing free oil and prevent oil leakage. The shortening had the following characteristics:

| SCI: | |
| --- | --- |
| 10° C. (50° F.) | 21 |
| 21° C. (70° F.) | 17 |
| 33° C. (92° F.) | 12 |
| % trans-unsaturated fatty acid: | 13.7 |
| fatty acid content: | |
| myristic (C-14) | 0.2 |
| palmitic (C-16) | 15.5 |
| stearic (C-18) | 10.0 |
| octadecenoic (C-18:1) | 43.0 |
| octadecadienoic (C-18:2) | 28.4 |
| octadecatrienoic (C-18:3) | 2.6 |

The plastic shortening was blended with Shortening 1 to obtain an outer dough shortening having the following SCI values:

| 10° C. (50° F.) | 26.8 |
| --- | --- |
| 21° C. (70° F.) | 14.9 |
| 33° C. (92° F.) | 5.1 |

The outer dough was prepared by first mixing the water with the molasses and soda. The shortenings and distilled monoglyceride were then added and the ingredients were mixed for 3 to 4 minutes. The sugar was then added and the ingredients mixed again. All the remaining ingredients were then mixed in, resulting in a 29.7 lb. batch of dough.

The inner dough was formed by mixing the ingredients in the following order: The high fructose corn syrup and water were mixed, then the shortenings, distilled monoglycerides, polyglycerol esters, and diacetyl tartaric acid esters of monoglycerides were added and mixed. The sugar was then added and mixed, and then the flour and other dry ingredients were mixed in.

The doughs were coextruded with a Rheon® encrusting machine, Model No. 207, available from Rheon U.S.A. 594 Industrial Ave., Paramus, N.J. Then doughballs were formed weighing about 12.7 grams each. The doughballs were placed onto stainless steel trays and baked in a Middleby-Marshall Oven (Model JS250) at 305° F. for about 7.2 minutes to make cookies. The cookies were cooled, packaged, and stored.

The cookies prepared from these doughs had noticeably improved mouthmelt and dissipation, and flavor display when compared by an expert panel with dual-textured cookies presently available. They were also judged to more closely approximate a freshly baked homemade cookie.

EXAMPLE 2

| Ingredients | Wt. Percent |
|---|---|
| Outer Dough (First Dough) | |
| Shortening 2 | 17.01 |
| Baking soda | 0.62 |
| White sugar (sucrose) | 20.21 |
| Brown sugar | 17.32 |
| Flour | 34.22 |
| Salt | 0.54 |
| Water | 9.01 |
| Crystalline dextrose | 0.82 |
| Egg white solids | 0.25 |
| Inner Dough (Second Dough) | |
| Shortening 3 | 19.69 |
| Mono- and diglycerides | 0.22 |
| Sucrose esters | 0.13 |
| High fructose corn syrup | 31.46 |
| Whole eggs | 2.03 |
| Baking soda | 0.51 |
| White sugar (sucrose) | 12.18 |
| Flour | 31.26 |
| Salt | 0.28 |
| Starch | 2.24 |
| Shortening 2 | |
| Hydrogenated soybean oil (IV = 80) | 73.0 |
| Slightly hydrogenated soybean oil (IV = 105-110) | 20.0 |
| Hydrogenated soybean oil/palm oil blend (IV = 43.5) | 6.0 |
| Rapeseed hardstock | 1.0 |
| Shortening 3 | |
| Hydrogenated soybean oil (IV = 83) | 54.0 |
| Hydrogenated cottonseed oil (IV = 61) | 3.0 |
| Slighty hydrogenated soybean oil (IV = 105-110) | 43.0 |

The oils were hydrogenated and blended as in Example 1. The shortenings produced had the following characteristics:

| Shortening 2 | |
|---|---|
| SCI: | |
| 10° C. (50° F.) | 31.4 |
| 21° C. (70° F.) | 18.0 |
| 33° C. (92° F.) | 3.9 |
| % trans-unsaturated fatty acid: | 40.0 |
| fatty acid content: | |
| lauric C-12) | 0.2 |
| myristic (C-14) | 0.1 |
| palmitic (C-16) | 10.3 |
| stearic (C-18) | 7.4 |
| octadecenoic (C-18:1) | 61.1 |
| octadecadienoic (C-18:2) | 17.4 |
| octadecatrienoic (C-18:3) | 1.8 |
| arachidic (C-20) | 0.5 |
| behenic (C-22) | 0.7 |
| Shortening 3 | |
| SCI: | |
| 10° C. (50° F.) | 29.7 |
| 21° C. (70° F.) | 16.8 |
| 33° C. (92° F.) | 0.7 |
| % trans-unsaturated fatty acid: | 44.1 |
| fatty acid content: | |
| lauric (C-12) | 0.2 |
| myristic (C-14) | 0.1 |
| palmitic (C-16) | 10.3 |
| stearic (C-18) | 5.6 |
| octadecenoic (C-18:1) | 62.5 |
| octadecadienoic (C-18:2) | 18.7 |
| octadecatrienoic (C-18:3) | 1.4 |
| arachidic (C-20) | 0.4 |
| behenic (C-22) | 0.4 |

The ingredients were mixed into dough and baked into cookies as in Example 1.

The cookies prepared from these doughs had noticeably improved mouthmelt and dissipation and flavor display when compared by a consumer panel with dual-textured cookies presently available. They were also judged to more closely approximate a freshly baked homemade cookie.

EXAMPLE 3

| Ingredients | Weight percent |
|---|---|
| Outer Dough (First Dough) | |
| Shortening 4 | 14.0 |
| Plastic shortening | 5.0 |
| Mono- and diglycerides | 0.6 |
| Water | 9.5 |
| Molasses | 1.5 |
| Baking soda | 0.5 |
| Sugar (sucrose) | 34.5 |
| Egg yolk solids | 1.0 |
| Flour | 32.5 |
| Salt | 0.7 |
| Starch | 0.1 |
| Egg white solids | 0.1 |
| Inner Dough (Second Dough) | |
| Shortening 4 | 13.5 |
| Mono- and diglycerides | 0.4 |
| Polyglycerol esters | 0.1 |
| Diacetyl tartaric acid esters of monoglycerides | 0.1 |
| Water | 0.5 |
| Baking soda | 0.4 |
| High fructose corn syrup | 22.0 |
| Sugar | 9.0 |
| Flour | 23.1 |
| Salt | 0.5 |
| Starch | 1.3 |
| Egg white solids | 0.1 |
| Chocolate chips | 29.0 |
| Shortening 4 | |
| 20% cottonseed/80% soybean oil blend (IV = 84) | 31.5 |
| 10% cottonseed/80% soybean oil blend (IV = 84) | 31.5 |
| Slightly hydrogenated soybean oil | 37 |

Shortening 4 was prepared by cohydrogenation of 2 soybean/cottonseed oil blends. Equal amounts of an 80% soybean/20% cottonseed oil blend and a 90% soybean/10% cottonseed oil blend were hydrogenated and then combined. The SCI was further adjusted by adding partially hydrogenated soybean oil having an IV of about 107.

The shortening product had the following characteristics:

| SCI: | |
|---|---|
| 10° C. (50° F.) | 29.1 |
| 21° C. (70° F.) | 14.6 |
| 27° C. (80° F.) | 6.8 |
| 33° C. (92° F.) | 0.3 |
| % trans-unsaturated fatty acid: | 55.6 |
| fatty acid content: | |
| palmitic (C-16) | 10.9 |
| stearic (C-18) | 5.1 |
| octadecenoic (C-18:1) | 62.1 |
| octadecadienoic (C-18:2) | 19.2 |
| octadecatrienoic (C-18:3) | 1.4 |

The cookies were prepared as in Example 1, except that in place of the Rheon ® machine, a noncommercial double ram extruder was utilized. The extruder produces a two-dough, concentrically arranged rope. The dough balls formed weighed about 13.4 grams each.

The cookies prepared from these doughs had noticeably improved mouthmelt and dissipation and flavor display when compared by a consumer panel with dual-textured cookies presently available. They were also judged to more closely approximate a freshly baked homemade cookie.

What is claimed is:

1. A baked sweetened cookie comprising a crumb-continuous matrix made from cookie ingredients, and having discrete regions of storage-stable crisp texture prepared from a second dough containing from about 10% to about 30% of a shortening having an SCI at 21° C. (70° F.) of from about 14.0 to about 20.0, and an SCI at 33° C. (92° F.) of from about 0.0 to about 8.0, flour, and readily crystallizable sugar, and discrete regions of storage-stable chewy texture prepared from a first dough containing from about 10% to about 30% of a shortening having an SCI at 21° C. (70° F.) of from about 12 to about 18.0 and an SCI at 33° C. (92° F.) of from about 0.0 to about 2.0, flour, and crystallization-resistant sugar or readily crystallizable sugar and a sugar crystallization inhibitor.

2. A product according to claim 1, wherein the second dough contains a shortening having an SCI at 33° C. (92° F.) of from about 0.0 to about 3.0.

3. A product according to claim 1, wherein the second dough conttains a shortening having an SCI at 21° C. (70° F.) of from about 15.0 to about 19.0.

4. A product according to claim 1, wherein the first dough contains a shortening having an SCI at 33° C. (92° F.) of about 0.

5. A product according to claim 1, wherein the first dough contains a shortening having an SCI at 21° C. (70° F.) of from about 13.0 to about 17.0.

6. A product according to claim 1, wherein each dough contains from about 16% to about 22% of said shortenings.

7. A product according to claim 1, wherein the second dough contains from about 16% to about 22% of a shortening having an SCI at 21° C. (70° F.) of from about 15.0 to about 19.0, and an SCI at 33° C. (92° F.) of from about 0.0 to about 3.0, and the first dough contains from about 16% to about 22% of a shortening having an SCI at 21° C. (70° F.) of from about 13.0 to about 17.0, and an SCI at 33° C. (92° F.) of about 0.

8. A product according to claim 1, wherein the shortenings contain a hydrogenated vegetable oil or blend of hydrogenated oils having fatty acid chains containing from about 14 to about 20 carbon atoms.

9. A product according to claim 8, wherein the hydrogenated vegetable oil is a blend of two or more hydrogenated oils selected from the group consisting of soybean, sunflowerseed, safflower, corn, Canola, palm, coconut, palm kernel, peanut, olive, and cottonseed oil, and palm oil olein.

10. A product according to claim 8, wherein the hydrogenated oil is selected from the group consisting of corn, palm, and cottonseed oil.

11. A product according to claim 9, wherein the hydrogenated oils are a blend of soybean oil and cottonseed oil.

12. A product according to claim 1, wherein the shortenings contain from about 2% to about 80% of a hydrogenated vegetable oil selected from the group consisting of cottonseed oil, palm oil, palm oil olein, and a blend thereof.

13. A product according to claim 1, wherein the shortenings further contain up to about 45% of a soft vegetable oil selected from the group consisting of partially hydrogenated soybean oil having an IV of from about 100 to about 112, cottonseed, peanut, olive, corn, sunflower, and safflower oil, and partially hydrogenated Canola oil, and a blend thereof.

14. A product according to claim 1, wherein the shortenings contain an animal fat.

15. A product according to claim 1, wherein the shortenings contain a blend of one or more hydrogenated vegetable oils and one or more animal fats.

16. A sweetened cookie dough preform, containing at least two doughs, which, when baked, provides a crumb-continuous cookie having a storage-stable plurality of textures, comprising a crumb-continuous matrix made from cookie ingredients, and having a second dough containing from about 10% to about 30% of a shortening having an SCI at 21° C. (70° F.) of from about 14.0 to about 20.0 and an SCI at 33° C. (92° F.) of from about 0.0 to about 8.0, flour, and readily crystallizable sugar, and a first dough containing from about 10% to about 30% of a shortening having an SCI at 21° C. (70° F.) of from about 12 to about 18.0 and an SCI at 33° C. (92° F.) of from about 0.0 to about 2.0, flour, and crystallization-resistant sugar or readily crystallizable sugar and a sugar crystallization inhibitor.

17. A product according to claim 16, wherein the second dough contains a shortening having an SCI at 21° C. (70° F.) of from about 15.0 to about 19.0 and an SCI at 33° C. (92° F.) of from about 1.5 to about 3.5, and the first dough contains a shortening having an SCI at 21° C. (70° F.) of from about 13.0 to about 17.0, and an SCI at 33° C. (92° F.) of about 0.

18. A product according to claim 16, wherein each dough contains from about 16% to about 22% of said shortenings.

19. A product according to claim 16, wherein the shortenings contain a hydrogenated vegetable oil or blend of hydrogenated oils having fatty acid chains containing from about 14 to about 20 carbon atoms.

20. A product according to claim 16, wherein the shortenings contain a blend of hydrogenated vegetable oils selected from the group consisting of soybean, sunflowerseed, safflower, corn, Canola, palm, palm kernel, peanut, olive, coconut, and cottonseed oil, and palm oil olein.

21. A product according to claim 20, wherein the hydrogenated oils are a blend of soybean oil and cottonseed oil.

22. A product according to claim 17, wherein the shortenings contain from about 2% to about 80% of a hydrogenated vegetable oil selected from the group consisting of cottonseed oil, palm oil, palm oil olein, and a blend thereof.

23. A product according to claim 17, wherein the shortenings contain up to about 45% of a soft vegetable oil selected from the group consisting of partially hydrogenated soybean oil having an IV of from about 100 to about 112, cottonseed, peanut, olive, corn, sunflower, and safflower oil, and partially hydrogenated Canola oil, and a blend thereof.

24. A product according to claim 16, wherein the shortenings contain an animal fat.

25. A product according to claim 16, wherein the shortenings contain a blend of one or more hydrogenated vegetable oils and one or more animal fats.

* * * * *